June 11, 1968  C. T. MATHERS  3,387,668
EARTH-WORKING TOOL
Filed Jan. 7, 1966  2 Sheets-Sheet 1
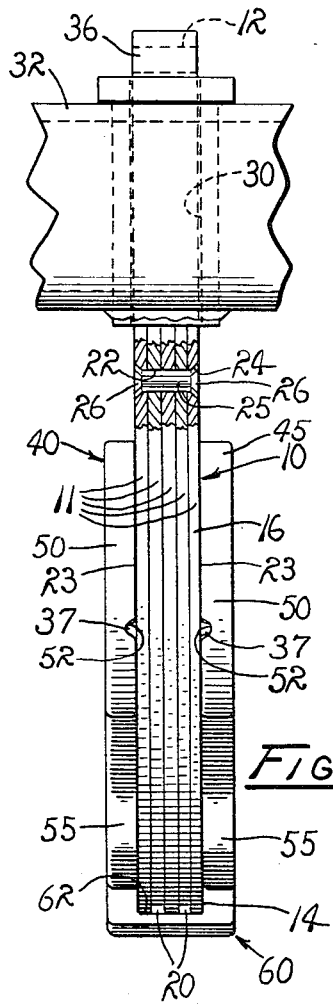
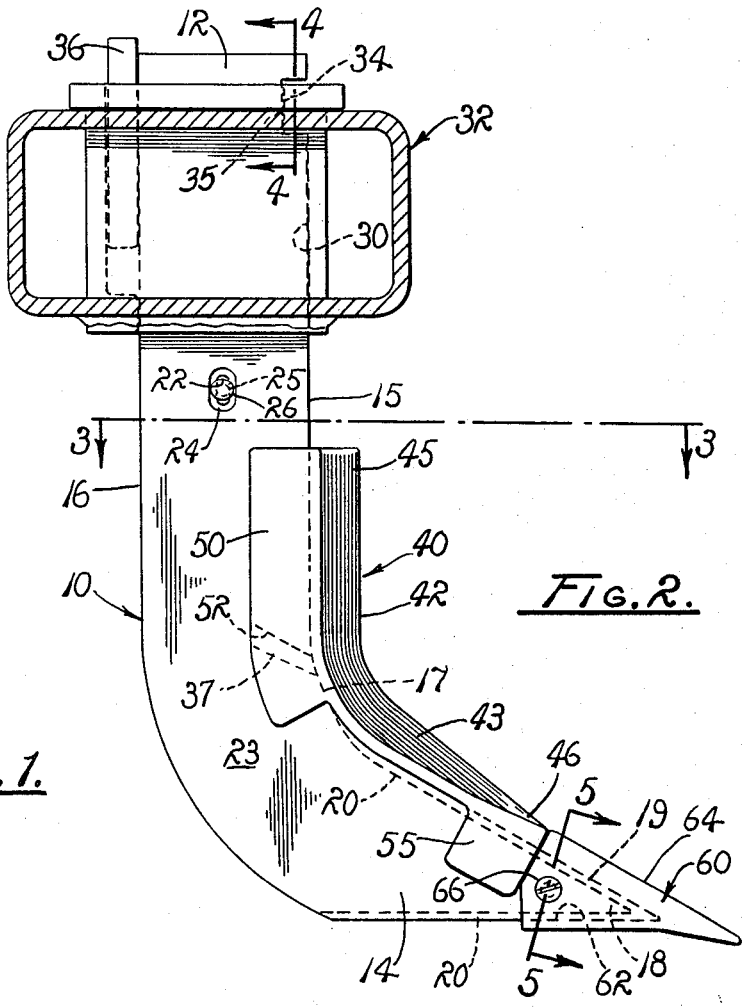
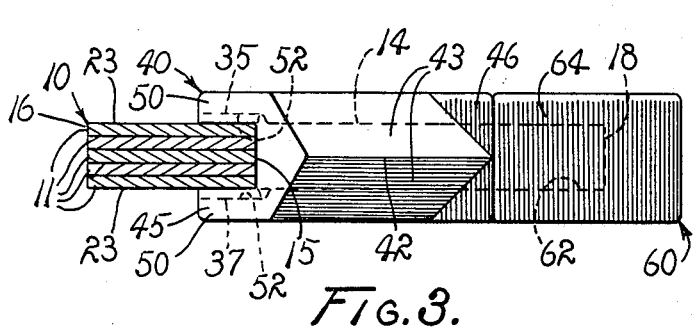
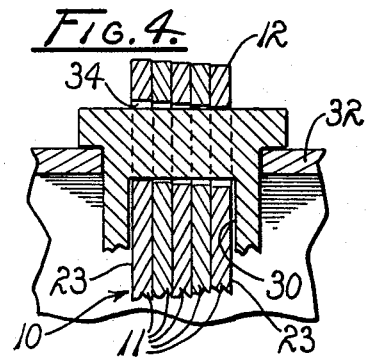
CHARLES T. MATHERS
INVENTOR
Huebner & Worrel
ATTORNEYS June 11, 1968  C. T. MATHERS  3,387,668
EARTH-WORKING TOOL
Filed Jan. 7, 1966  2 Sheets-Sheet 2
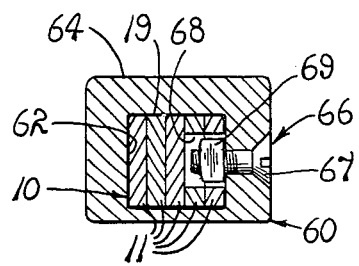
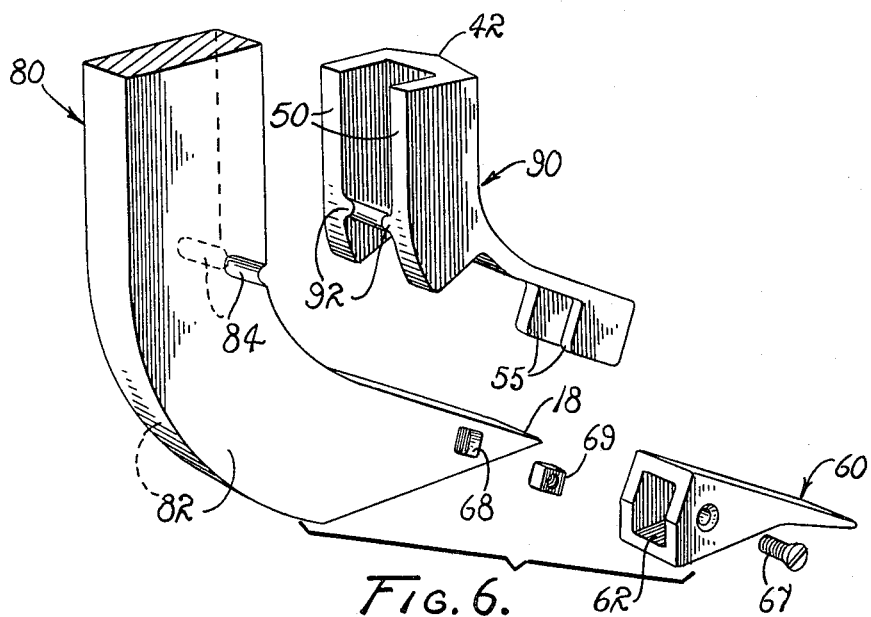
CHARLES T. MATHERS
INVENTOR
Huebner & Worrel
ATTORNEYS United States Patent Office 3,387,668
Patented June 11, 1968

3,387,668
EARTH-WORKING TOOL
Charles T. Mathers, Los Angeles, Calif., assignor to Orendorff Manufacturing Company, a corporation of California
Filed Jan. 7, 1966, Ser. No. 519,311
4 Claims. (Cl. 172—719)

ABSTRACT OF THE DISCLOSURE

An earth-working tool for rippers and the like having an elongated shank providing an earth penetrating end obtusely angularly forwardly extended therefrom including a tooth of a predetermined length mounted on said earth penetrating end and an elongated guard mounted on the shank and having spaced flanges defining a channel to receive the shank in complementarily fitted relation, said shank and said flanges of the guard including cooperative formations in meshing relation with the tooth abutting the guard to constrain the same upon the shank.

---

A conventional ripper or scarifier tool provides an elongated shank having an upper mounting end and a slightly forwardly curved lower earth penetrating end. The lower end of such conventional shank is nearly straight and is only extended from the main portion of the shank as far as required for mounting a hardened point or tooth thereon. With the slight angular relationship between the lower end of the shank and its main portion, the tooth is disposed at a relatively steep angle which has an undesirable bulldozing effect when motivated through the earth or other surfacing material. The portion of the shank immediately above the tooth is commonly known as the throat portion of the shank and in such conventional shank configuration is subject to excessive wear from material initially engaged by the tooth sliding passed the shank. The tooth is intended initially to penetrate and shatter the earth material ahead of the shank. However, due to the relatively close connection between the tooth and the main portion of the shank, the material shattered or broken by the tooth is immediately engaged by the shank since there is not sufficient space between the tooth and the shank in which to permit the tooth to deflect or move such material out of the path of the shank. This bulldozing effect of the shank not only accelerates wearing of the shank but also substantially increases the power required to force the tooth through the earth material. As a result, greater stresses are imposed upon the ripper components and the prime mover than desired. Such problems may be typified by ripper operation during the rehabilitation of roads having an oil mixture or asphalt surface. During such rehabilitation, the surface "cake" must be scalped off without disturbing or bringing up and mixing the subbase material with the cake. Such intermixing is highly undesirable in that it requires additional oil or asphalt to re-establish the proper consistency. The described conventional scarifier shanks with their steeply angled points will not slide under the oil cake but tend to push the material forwardly in large chunks with the point of the tooth penetrating the subbase to bring up such subbase material. It has been found that a scarifier tool that pushes the material rather than sliding under and lifting the material requires approximately twice the draft forces to perform a similar job.

In order to reduce wear on the shanks, it has been the practice to provide throat guard attachments on the shanks immediately above the teeth. Such throat guards are usually retained in place by straps circumscribing their shanks. However, with the above described bulldozing effect of the conventional shanks the movement of the described large chunks of material passed the shanks is concentrated in the area of the throat portion and has been known to wear the straps completely through, permitting the guards to be separated from the shanks after relatively short periods of use. Furthermore, when such ripper and scarifier tools are employed in the described road rehabilitation operations, the teeth are usually positioned along the side of the road which provides the best access for the teeth to be initially inserted beneath the oil cake. As a result, great lateral bending forces are imposed against the shank which cannot be adequately absorbed by the shanks and frequently cause rapid fatigue failure of the shanks and other related components.

Accordingly, it is an object of the present invention to provide an improved earth working tool for rippers, scarifiers and the like.

Another object is to provide such an improved earth working tool which is capable of mounting a tooth thereon so as to provide a lighter draft than conventional earth working tools available for the purpose.

Another object is to provide an earth working tool of the character described which has an elongated throat portion to space the tooth ahead of the shank a sufficient distance to insure substantially complete shattering of the earth material ahead of the shank.

Another object is to provide an earth working tool having a shank incorporating a throat guard which effectively deflects ripped material passed the shank.

Another object is to provide an earth working tool having a throat guard which may be quickly and conveniently fectively deflects ripped material past the shank.
physical labor.

Another object is to provide an earth working tool having a throat guard which includes a locking mechanism which is not subject to the ordinary wear from ripped earth material.

Another object is to provide an earth working tool having a throat guard which provides a locking mechanism completely enclosed by a guard.

Another object is to provide an earth working tool having a shank capable of absorbing lateral bending forces without fracture or premature fatigue.

Other objects and advantages of the present invention will subsequently become more clearly apparent upon reference to the following description and accompanying drawings.

In the drawings:

FIG. 1 is a rear elevation of an earth working tool embodying the principles of the present invention having a shank constructed of a plurality of laminated members.

FIG. 2 is a side elevation of the shank of FIG. 1 having a tooth and throat guard mounted thereon.

FIG. 3 is a transverse horizontal section through the shank showing the guard and tooth in plan, taken on line 3—3 of FIG. 2.

FIG. 4 is a somewhat enlarged, transverse vertical section through the upper mounting end of the shank, taken on line 4—4 of FIG. 2.

FIG. 5 is a somewhat enlarged transverse substantially vertical section through the locking mechanism of the tooth taken on line 5—5 of FIG. 2.

FIG. 6 is a partially exploded perspective view of a second form of shank embodying the principles of the present invention in which the shank is formed of a solid bar.

Referring more particularly to the drawings, a tool embodying the principles of the present invention provides an elongated shank generally indicated by the numeral 10. The shank is constructed of a plurality of laminated congruently disposed members 11 which may vary in number, depending upon the size of the tool and the particular material for which it is intended to be employed. The shank 10 has an upper mounting end 12, an opposite lower earth penetrating end 14, and predetermined forward and rearward edges 15 and 16, respectively. The shank further includes an elongated arcuate throat portion 17 disposed in the forward edge 15 intermediate the ends which extends the lower earth penetrating end 14 in relatively forwardly obtusely angularly extended relation from the upper mounting end 12. The lower earth penetrating end of the shank has a pointed tip 18 and an inclined upper surface 19.

The laminated members 11 of the shank 10 are rigidly interconnected by a plurality of continuous beads of weld indicated by the reference numeral 20 about the marginal edge of the lower earth penetrating end 14. The upper mounting end 12 of the shank formed by the laminated members 11 has a transversely extended elongated bore 22 therethrough with the outermost members providing outer side surfaces 23 for the shank individually providing a chamfered surface 24 in circumscribing relation to the bore. An elongated tie bolt 25, of a diameter substantially smaller than the bore, is extended therethrough and retained by tapered opposite head portions 26 complementarily received in the chafered surfaces 24 of the bore. It is readily apparent that the tie bolt precludes transverse separation of the members while permitting limited longitudinal sliding movement between the members. Alternatively, the upper ends of the members may be held in assembly by numerous other devices which similarly permit such relative longitudinal movement such as a band, not shown, disposed in circumscribing relation about the members or by an elastic adhesive material disposed between each of the members.

The upper end 12 of the shank 10 is adapted to be extended through an opening 30 in an elongated tool bar fragmentarily indicated by the numeral 32. The tool bar is more fully shown and described in copending application Serial No. 513,042 entitled "Tool Mounting Device" filed December 10, 1965. The shank is constrained in the tool bar in a substantially upright operating position. The forward edge 15 of the upper end of the shank includes a notch 34 which embraces a protuberance 35 on the tool bar. A retainer 36 is inserted behind the shank to maintain engagement of the notch and protuberance to preclude longitudinal relative movement between the shank and the tool bar. The tool bar is adapted to be mounted on a prime mover, or other tool carrier, not shown, for movement in a predetermined forward direction from left to right, as viewed in FIG. 2.

Each of the outermost laminated members 11 of the tool shank 10 provides an elongated protuberance or key extended from the front edge 15 of the shank. The key extends angularly rearwardly upwardly from the front edge to provide an elongated axis disposed in spaced, substantially parallel relation to the inclined upper surface 18 of the lower earth penetrating end 14 of the shank. An elongated arcuate throat guard 40 is provided for attachment to the shank in complementarily fitted relation to the throat portion 17 thereof. The guard has a forwardly disposed chisel point face 42 providing symmetrically tapered surfaces 43 extended between its opposite upper and lower ends 45 and 46, respectively. A pair of transversely spaced, substantially parallel, upper flanges 50 are rearwardly extended from the guard and individually provide elongated notches or key ways 52. A pair of lower flanges 55 are extended from the lower end 46 of the guard and are adapted to embrace the opposite sides 23 of the lower earth penetrating end 14 of the shank.

An elongated tooth 60 of hardened metal material provides a socket 62 which is adapted to be fitted on the pointed tip 18 of the shank 10. The tooth provides an inclined upper surface 64 substantially coextensive with the lower end 46 of the throat guard 40. The tooth is held on the end of the shank by a locking assembly 66. The assembly provides a bolt 67 having an elongated tapered head disposed flush with the outer surface of the tooth for extension into a recess 68 in one of the outermost and adjacent laminated members 11. A nut 69 is disposed in the recess and screw threadably received upon the extended end of the bolt and tightened against the inner wall of the tooth to preclude longitudinal relative movement between the tooth and the shank.

*Second form*

A second form of the shank and throat guard is shown in FIG. 6. In this form, the shank 10 is constructed of a solid bar indicated by the numeral 80 which is substantially identical in overall configuration to the shank 10 constructed of the laminated members 11. The shank 80, however, distinguishes from the shank 10 of the first form in providing opposite sides 82 individually including elongated notches or key ways 84 in the same position and attitude as the keys 37 on the shank 10 of the first form. A second form of throat guard is indicated by the numeral 90 in FIG. 6. This form of guard distinguishes from the guard 40 of the first form in providing elongated protuberances or keys 92 on the upper flanges 50 in substitution for the key ways 52 on the guard 40 of the first form.

*Operation*

The operation of the described embodiments of the subject invention is believed to be clearly apparent and is briefly summarized at this point. Prior to operation, a plurality of the shanks 10 are individually mounted in a plurality of openings 30 of the tool bar 32. The shanks are constrained in assembly with the tool bar by their respective notches 34 embracing the protuberances 35. A retainer 36 is inserted behind each of the shanks to maintain the described meshing relation between the notches and protuberances to preclude longitudinal relative movement between the shanks and the tool bar.

The throat guard 40 is mounted in conforming relation to the throat portion 17 of the shank 10 by first resting the guard against the upper surface 19 and sliding it upwardly rearwardly until the upper flanges 50 thereof embrace the opposite sides 23 of the shank. During such movement, the key ways 52 in the flanges slide over and receive the elongated keys 37 on the outermost laminated members 11. Accordingly, the throat guard is locked in assembly with the shank and is precluded from inadvertant removal except by reversing the above described installation procedure. In order positively to preclude such reverse movement of the guard downwardly along the upper surface of the shank, the tooth 60 is mounted on the lower end 14 of the shank in abutting relation to the lower end of the guard. Such mounting is accomplished by inserting the nut 69 of the locking assembly 66 into the recess in the lower end of the shank. The tooth is then disposed in its operating position of FIG. 2 and the bolt 67 extended through the countersunk bore in the tooth into screw threading engagement with the nut 69.

With the shank 10 mounted on the tool bar 32 in the above described manner as shown in FIG. 2, the upper mounting end 12 of the shank is disposed in a substantially upright vertical position which represents a normal operating attitude for the combined assembly. In such position, the upper surface 64 of the tooth 60 and the coextensible surface of the throat guard 40 are gradually upwardly rearwardly inclined to provide the optimum angle of attack during movement of the tooth and shank through the earth. Such angle further permits the shattered or separated earth material to be lifted and rolled upwardly ahead of the shank so that only a minimum amount of draft is required to motivate the shank through the earth. Furthermore, a minimum of material is forced against the throat portion of the shank, thereby substantially reducing the wear on the throat portion which area is ordinarily subjected to greatly accelerate wear when conventional tooth and shank configurations are employed. As a result, the shank and throat guard 40 are not required to bulldoze through the earth material in a cumulative mounding effect but penetrates in an efficient wedging action. However, if any material initially encountered by the tooth is not fully shattered or deflected, the tapered surfaces 43 and the chisel point face 42 of the guard are effective easily to slice through and deflect the material away from the vulnerable throat portion of the shank.

Frequently during the ripping operation, the tooth and lower end of the shank meet an obstruction which is sufficiently large or so firmly implanted that the tooth is laterally deflected passed the obstruction. Such deflection imposes a great strain on the shank and in rippers employing solid shanks, the internal stresses developed by such lateral bending has caused permanent distortion or early fatigue failure of the shank or other mounting components. However, in the laminated shank structure of the present invention, the individual members are permitted lateral flexing and concomitant longitudinal relative movement completely to absorb and preclude the transmission of such stresses upwardly through the shank to the tool bar and other mounting components. This is best shown in FIG. 4 wherein the notch 34 of the shank is shown with the individual laminated members 11 longitudinally displaced during a deflection of the lower end of the shank to the left, as viewed in FIG. 4. Such relative movement is permitted by the tie bolt 25 which is permitted to move through the elongated bore 22 in the members 11. The flexing by the laminations permits ready accommodation to lateral stresses, resists permanent distortion, and virtually eliminates fatigue failure.

The second form of the throat guard 90 of FIG. 6 is assembled and constrained on the modification solid shank 80 in the identical manner to that of the first form. As before, the guard is rested upon the upper surface of the lower end of the shank and slid upwardly rearwardly until the upper flanges of the guard are disposed in embracing relation with the shank. During such movement, the keys 92 of the guard are received within the elongated key ways 84 in the shank to constrain the guard against relative movement thereon in the identical manner in which the keys 37 on the laminated shank are received within the key ways 52 of the guard 40 of the first form. The same tooth 60 is then mounted on the lower end of the solid shank in abutting relation to the lower end of the guard 90 positively to preclude inadvertent removal of the guard from the shank.

The tooth 60 is spaced a distance forwardly outwardly from the leading edge of the mounting end of the shank, a distance substantially corresponding to the length of the tooth.

In view of the foregoing, it is readily apparent that the structure of the present invention has provided an improved tool for rippers, scarifiers and the like which has an elongated throat portion which spaces the tooth sufficiently ahead of the shank substantially to minimize wear on the vulnerable throat portion of the shank. The gradually inclined upper surface of the tooth and guard is determined by the comparable angle of the lower end of the shank which permits the tooth to be disposed at an optimum angle requiring a minimum of power from the prime mover to motivate the tooth and shank through the earth. Furthermore, the laminated structure of the shank permits the internal stresses developed by the transverse bending forces imposed against the lower end of the shank to be substantially absorbed without fatigue failure and in a manner to isolate such forces and to preclude their transmission to the other ripper components. The shank of the present invention further permits the throat guard to be positively constrained on the shank without the usual mechanical connections required by conventional structures.

Although the invention has been herein shown and described in what are conceived to be the most practical and preferred embodiments, it is recognized that departures may be made therefrom within the scope of the invention, which is not to be limited to the details disclosed herein.

Having described my invention, what I claim as new and desire to secure by Letters Patent is:

1. An earth working tool adapted to be transported in a predetermined relative forward direction of travel comprising an elongated shank having opposite sides, a mounting end disposed in substantially upright attitude, an earth penetrating end providing a surface obtusely angularly forwardly extended from the mounting end of the shank, and an elongated arcuate throat portion disposed intermediate said ends, said sides of the shank individually providing elongated grooves having axes disposed in spaced substantially parallel relation to said surface of the earth penetrating end of the shank; a tooth of a predetermined length; means releasably mounting the tooth on said earth penetrating end of the shank with said throat portion spacing the tooth from the mounting end of the shank in a direction measured transversely outwardly therefrom a distance comparable in length to the length of the tooth; and an elongated arcuate guard having spaced flanges individually providing elongated protuberances with the flanges defining a channel to receive the shank and with said protuberances individually receivable within said grooves to mount the guard in an operating position complementarily fitted to said throat portion of the shank, said tooth abutting the guard to constrain the same in said operating position.

2. An earth working tool comprising an elongated shank having a mounting end portion, an earth engaging end portion, a leading edge, a trailing edge, and opposite sides, the leading edge of the shank at the mounting end portion being angularly related to said leading edge at the earth engaging end portion and providing a concavity therebetween; a guard fitted to said concavity for slidable movement along the leading edge and providing opposite flanges slidably embracing opposite sides of the shank; slidably fitted key and key way formations between the flanges and their respective sides of the shank limiting sliding movement of the guard on the shank to a rectilinear path inwardly of said leading edge and away from the earth engaging end portion and outwardly of said leading edge and toward said earth engaging end portion; and a tooth of a predetermined length releasably mounted on the earth engaging end portion of the shank abutting the guard and blocking its movement outwardly of said forward edge and toward the earth engaging end portion with said tooth being spaced a distance forwardly outwardly from said mounting end of the shank substantially corresponding to the length of the tooth.

3. An earth working tool adapted to be transported in a predetermined relative forward direction of travel comprising an elongated shank having opposite sides, a mounting end disposed in substantially upright attitude, an earth penetrating end providing a surface obtusely angularly forwardly extended from the mounting end of the shank, and an elongated arcuate throat portion disposed intermediate said ends; a tooth of a predetermined length; means releasably mounting the tooth on said earth penetrating end of the shank with said throat portion spacing the tooth from the mounting end of the shank in a direction measured transversely outwardly therefrom a distance substantially corresponding to the length of the tooth; and an elongated arcuate guard mounted for sliding movement upon said surface of the shank and having spaced flanges defining a channel to receive the shank in complementarily fitted relation to said throat portion, said sides of the shank and said flanges of the guard including cooperative slidably meshing members having common axes disposed in spaced substantially parallel relation to said surface of the earth penetrating end of the shank with said tooth abutting the guard to constrain the same in said complementarily fitted relation on the shank.

4. The tool of claim 3 in which said meshing members comprise slidably fitted key and key way formations between the flanges of the guard and their respective sides of the shank limiting sliding movement of the guard on the shank to a rectilinear path inwardly toward the mounting end of the shank and away from said earth penetrating end and outwardly of said mounting end and toward said earth penetrating end.

References Cited

UNITED STATES PATENTS

| | | | |
|---|---|---|---|
| 478,730 | 7/1892 | Abbott | 172—704 |
| 3,001,591 | 9/1961 | Johnson | 172—700 |
| 3,254,727 | 6/1966 | Helton et al. | 172—719 |

ABRAHAM G. STONE, *Primary Examiner.*

S. C. PELLEGRINO, *Assistant Examiner.*